(12) United States Patent
Karnik et al.

(10) Patent No.: US 10,516,905 B2
(45) Date of Patent: Dec. 24, 2019

(54) DYNAMIC SERVICE FLOW CREATION FOR PACKET CABLE QUALITY OF SERVICE GUARANTEE IN A DISTRIBUTED CABLE MANAGEMENT SYSTEM

(71) Applicant: Gainspeed, Inc., Sunnyvale, CA (US)

(72) Inventors: Rajesh Karnik, Cupertino, CA (US); Utku Yilmaz, Mountain View, CA (US); Philip Winterbottom, San Jose, CA (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 10 days.

(21) Appl. No.: 15/054,112

(22) Filed: Feb. 25, 2016

(65) Prior Publication Data

US 2016/0295253 A1 Oct. 6, 2016

Related U.S. Application Data

(60) Provisional application No. 62/141,785, filed on Apr. 1, 2015.

(51) Int. Cl.
*H04N 7/173* (2011.01)
*H04N 21/2385* (2011.01)
*H04N 21/222* (2011.01)
*H04N 21/235* (2011.01)
*H04N 21/2383* (2011.01)
*H04N 21/24* (2011.01)
*H04N 21/61* (2011.01)
(Continued)

(52) U.S. Cl.
CPC ..... *H04N 21/2385* (2013.01); *H04L 41/5054* (2013.01); *H04L 41/5087* (2013.01);
(Continued)

(58) Field of Classification Search
CPC .......... H04N 21/2385; H04N 21/2221; H04N 21/235; H04N 21/2383; H04N 21/2402;
(Continued)

(56) References Cited

U.S. PATENT DOCUMENTS 7,016,317 B1   3/2006   Pathak et al.
8,281,355 B1  10/2012   Weaver et al.
(Continued)

OTHER PUBLICATIONS

PCT/US2016/025764, Apr. 1, 2016 (filing date), Gainspeed, Inc.
International Search Report and Written Opinion for PCT/US2016/025764, dated Jul. 18, 2016, Gainspeed, Inc.

*Primary Examiner* — Kyu Chae
(74) *Attorney, Agent, or Firm* — Loza & Loza, LLP; Jessica W. Smith

(57) ABSTRACT

Some embodiments provide a method for dynamically creating a service flow for an Ethernet node (EN) in a distributed cable management system that includes a cable headend and several in-the-field ENs for connecting several service nodes to the headend. For a particular device of a particular service node, the method receives a request to create a set of parameters for a service flow that is to be dynamically created. In some embodiments, the received request is in response to a request for a phone call that is to have a quality of service (QoS) guarantee and the service flow is for a PacketCable (PC) connection session. For the service-flow parameter request, the method identifies the EN that connects to the particular service node from a group of several EN that the method manages. The method then forwards a set of authorized dynamic QoS (DQoS) parameters to the identified EN, so that the identified EN can use the forwarded DQoS parameter set to validate a service flow request from the particular device to the EN to create the service flow. The forwarded DQoS parameter set is part of a pre service-flow request that the method sends to the identified EN in some embodiments to direct the identified EN to prepare for a possible service flow request from the particular device.

10 Claims, 6 Drawing Sheets

(51) Int. Cl.
*H04N 21/6338* (2011.01)
*H04N 21/643* (2011.01)
*H04N 21/647* (2011.01)
*H04L 12/24* (2006.01)

(52) U.S. Cl.
CPC ....... *H04N 21/2221* (2013.01); *H04N 21/235* (2013.01); *H04N 21/2383* (2013.01); *H04N 21/2402* (2013.01); *H04N 21/6118* (2013.01); *H04N 21/6338* (2013.01); *H04N 21/64322* (2013.01); *H04N 21/64769* (2013.01)

(58) Field of Classification Search
CPC ........... H04N 21/6118; H04N 21/6338; H04N 21/64322; H04N 21/64769; H04L 41/5054; H04L 41/5087
See application file for complete search history.

(56) References Cited

U.S. PATENT DOCUMENTS

| | | | |
|---|---|---|---|
| 2003/0154488 A1* | 8/2003 | Strater | H04L 47/15 725/95 |
| 2004/0160963 A1 | 8/2004 | Dong et al. | |
| 2004/0181811 A1* | 9/2004 | Rakib | H04L 63/062 725/122 |
| 2005/0073997 A1* | 4/2005 | Riley | H04L 29/06027 370/352 |
| 2005/0078688 A1* | 4/2005 | Sharma | H04L 12/2801 370/401 |
| 2007/0008882 A1 | 1/2007 | Oran | |
| 2010/0061235 A1* | 3/2010 | Pai | H04L 12/2801 370/230.1 |
| 2010/0290366 A1* | 11/2010 | Garcia | H04L 12/2801 370/254 |
| 2011/0019551 A1 | 1/2011 | Adams et al. | |
| 2011/0314086 A1 | 12/2011 | Finkelstein et al. | |
| 2012/0047273 A1 | 2/2012 | Ajero et al. | |
| 2012/0294147 A1* | 11/2012 | Ajero | H04L 12/2801 370/230 |
| 2013/0070757 A1* | 3/2013 | Elliott | H04L 12/6418 370/352 |
| 2013/0128740 A1 | 5/2013 | Devine et al. | |
| 2013/0212246 A1 | 8/2013 | Koponen et al. | |
| 2014/0064267 A1* | 3/2014 | Thi | H04B 3/23 370/352 |
| 2014/0160989 A1* | 6/2014 | Krantz | H04L 12/2801 370/259 |

\* cited by examiner

DYNAMIC SERVICE FLOW CREATION FOR PACKET CABLE QUALITY OF SERVICE GUARANTEE IN A DISTRIBUTED CABLE MANAGEMENT SYSTEM

BACKGROUND

Cable television (CATV), originally introduced in the late 1940's as a way to transmit television signals by coaxial cables to houses in areas of poor reception, has over the years been modified and extended to enable the cable medium to transport a growing number of different types of digital data, including both digital television and broadband Internet data.

One of the most significant improvements occurred in the 1990's, when a number of major electronics and cable operator companies, working through CableLabs, a non-profit R&D consortium, introduced the Data Over Cable Service Interface Specification (DOCSIS). First introduced in the late 1990's as DOCSIS version 1.0, and upgraded many times since (currently at DOCSIS version 3.0, with a draft DOCSIS 3.1 specification released in 2013), the DOCSIS standard defines the Physical Layers (PHY) and Media Access Control (MAC) layers needed to send relatively large amounts of digital data through coaxial cables that were originally designed to handle analog standard definition television channels.

This television signal was transmitted as a combination amplitude modulated signal (for the black and white portion), quadrature-amplitude modulated signal (for the color portion), and frequency modulated signal (for the audio portion), and this combined signal will be designated as a Frequency Division Multiplexed (FDM) signal. With the advent of digital television and high definition television standardization in the late 1980's and early 1990's, the basic 6 MHz bandwidth spectrum of analog television was retained, but the modulation scheme was changed to a more sophisticated and higher data rate Quadrature Amplitude Modulation (QAM) scheme, which can encode digital information onto a very complex QAM analog signal (waveform).

The DOCSIS standard was built upon this analog and digital TV foundation, and specified additional standards to provide broadband Internet services (Internet protocols, or IP), voice over IP, custom video on demand, and other modern services based upon the QAM data transmission waveforms previously established for digital and high definition television.

As a result, simple coaxial cables have been gradually upgraded to accommodate ever-increasing demands for digital data. At each house (or apartment, office, store, restaurant or other location), the household connects to the CATV cable by a cable modem, uses the cable modem to extract downstream DOCSIS digital data (frequently used for high-speed Internet), and inject upstream DOCSIS digital data (again frequently used for high-speed Internet applications).

Unfortunately, even in a coax cable, there is a finite amount of bandwidth available to transmit data. Coax cables and their associated radiofrequency interface equipment have typically only used the frequency range under about 1000 MHz, and so there are limits to how much data the 1950's era coaxial cable can ultimately transmit. By contrast, optical fiber (fiber optics, fiber) technology, which uses much higher optical frequencies (with wavelengths typically in the 800-2000 nanometer range), can transmit a much higher amount of data. Optical fiber data rates typically are in the tens or even hundreds of gigabits per second. Indeed, the entire RF CATV cable spectrum from 0 to 1000 MHz can be converted to optical wavelengths (such as 1310 nm or 1550 nm), be carried over an optical fiber, and then be converted back to the full RF CATV cable spectrum at the other end of the fiber, without coming close to exhausting the ability of the optical fiber to carry additional data. This conversion process can be achieved by relatively simple optical to digital or digital to optical converters, in which the CATV RF waveforms are simply converted back and forth to a light signal by simple ("dumb") E/O or O/E converters, located in nodes that connect optical fibers to CATV cable (fiber nodes).

Optical fiber technology has been widely used for high capacity computer networks, and these networks often do not use the DOCSIS protocols or QAM protocols to transmit data. Rather, these high capacity computer networks often use entirely different types of data transmission protocols, such as the Ethernet protocols IEEE 802.3ah, 1000BASE-LX10, 1000Base-BX10, and others. These networks and protocols are often referred to as GigE networks, which is an abbreviation of the Gigabyte speeds and Ethernet protocols used for fiber based computer network. Thus if a user desires to transfer computer data from RF QAM waveforms transported over a CATV cable to a high speed GigE fiber network, the data must be transformed back and forth between the DOCSIS cable QAM waveforms and the alternate protocols (often Ethernet protocols) used in fiber GigE networks.

Although ideally, the best way to satisfy the ever increasing household demand for digital data (e.g. video-on demand, high speed Internet, voice over IP, etc.) would be by extending optical fiber to each household, this would be an incredibly expensive solution. By contrast, cable based CATV solutions have already been implemented for tens of millions of households, and this expense has already been borne and amortized over decades of use, starting from the 1950s. As a result, it is far more economically attractive to find schemes enable the existing, if bandwidth limited, CATV cable system, to be further extended to meet the ever-growing demands for additional data.

SUMMARY

Some embodiments provide a method for dynamically creating a service flow for an Ethernet node (EN) in a distributed cable management system that includes a cable headend and several in-the-field ENs for connecting several service nodes to the headend. For a particular device of a particular service node, the method receives a request to create a set of parameters for a service flow that is to be dynamically created. In some embodiments, the received request is in response to a request for a phone call that is to have a quality of service (QoS) guarantee and the service flow is for a PacketCable (PC) connection session.

For the service-flow parameter request, the method identifies the EN that connects to the particular service node from a group of several EN that the method manages. The method then forwards a set of authorized dynamic QoS (DQoS) parameters to the identified EN, so that the identified EN can use the forwarded DQoS parameter set to validate a service flow request from the particular device to the EN to create the service flow. The forwarded DQoS parameter set is part of a pre service-flow request that the method sends to the identified EN in some embodiments to direct the identified EN to prepare for a possible service flow request from the particular device.

In some embodiments, the method is performed by a set of one or more controllers that manages the group of EN. Also, in some embodiments, the method receives the service-flow parameter request from a call management server (CMS) that processes a phone call request from the particular device at the particular service node. The method in some embodiments provides to both the CMS and the identified EN a service flow identification handle, called a gate identifier or Gate ID. The CMS provides the Gate ID to the particular device, so that the device can provide this identifier to the identified EN with its service flow request to the identified EN. In some embodiments, the CMS and the particular device exchange the phone call request and the provided Gate ID through the identified EN but in an out-of-band communication channel that is transparent to the identified EN and any intermediate cable management system components (e.g., switch, packet engine, edge router) that are in the path between the particular device and the CMS.

After receiving the phone call request, the CMS ensures that the party (e.g., number) being dialed is available (e.g., is in a mode to accept calls). If the dialed party is available, the CMS identifies the DQoS parameter set that is stored in a CMS-accessible storage for the particular device that is requesting the call. The CMS then provides the DQoS parameter set to the controller set with the service flow request.

In some embodiments, when the device provides the identified EN with a service flow request, the device also provides to the identified EN a set of requested DQoS parameters. The identified EN then determines whether the requested set of DQoS parameters should be provided by comparing the requested set with the forwarded set of DQoS parameters. The identified EN creates the requested service flow when the requested set of DQoS parameters comports with the forwarded set of DQoS parameters (e.g., when none of the QoS parameters in the requested set exceed the corresponding QoS parameters in the forwarded set), and rejects the service flow request when the requested set does not comport with the forwarded set (e.g., when one or more QoS parameters in the requested set exceed the corresponding QoS parameters in the forwarded set).

In some embodiments, the EN creates two service flows for each authorized PC connection session. One created service flow is for downstream data packets to the dialing device (i.e., the particular device) while another created service flow is for upstream data packets from the dialing device. Even though the EN creates two service flows for each authorized PC connection session, both these service flows are associated with the same Gate ID in some embodiments.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide a method for dynamically creating a service flow for an Ethernet node (EN) in a distributed cable management system that includes a cable headend and several in-the-field ENs for connecting several service nodes to the headend. For a particular device of a particular service node, the method receives a request to create a set of parameters for a dynamically created service flow. In some embodiments, the received request is in response to a request for a phone call that is to have a quality of service (QoS) guarantee. For the service-flow parameter request, the method identifies the EN that connects to the particular service node from a group of several EN that the method manages. The method then forwards a set of authorized dynamic QoS (DQoS) parameters to the identified EN, so that the identified EN can use the forwarded DQoS parameter set to validate a service flow request from the particular device to the EN to create the service flow. The forwarded DQoS parameter set is part of a pre service-flow request that the method sends to the identified EN in some embodiments to direct the identified EN to prepare for a possible service flow request from the particular device.

In some embodiments, the EN creates two service flows for each authorized PC connection session. One created service flow is for downstream data packets to the dialing device (i.e., the particular device) while another created service flow is for upstream data packets from the dialing device. Even though the EN creates two service flows for each authorized PC connection session, both these service flows are associated with the same service flow identification handle in some embodiments. This handle is referred to as a gate identifier (Gate ID) in some embodiments.

Figure 1:
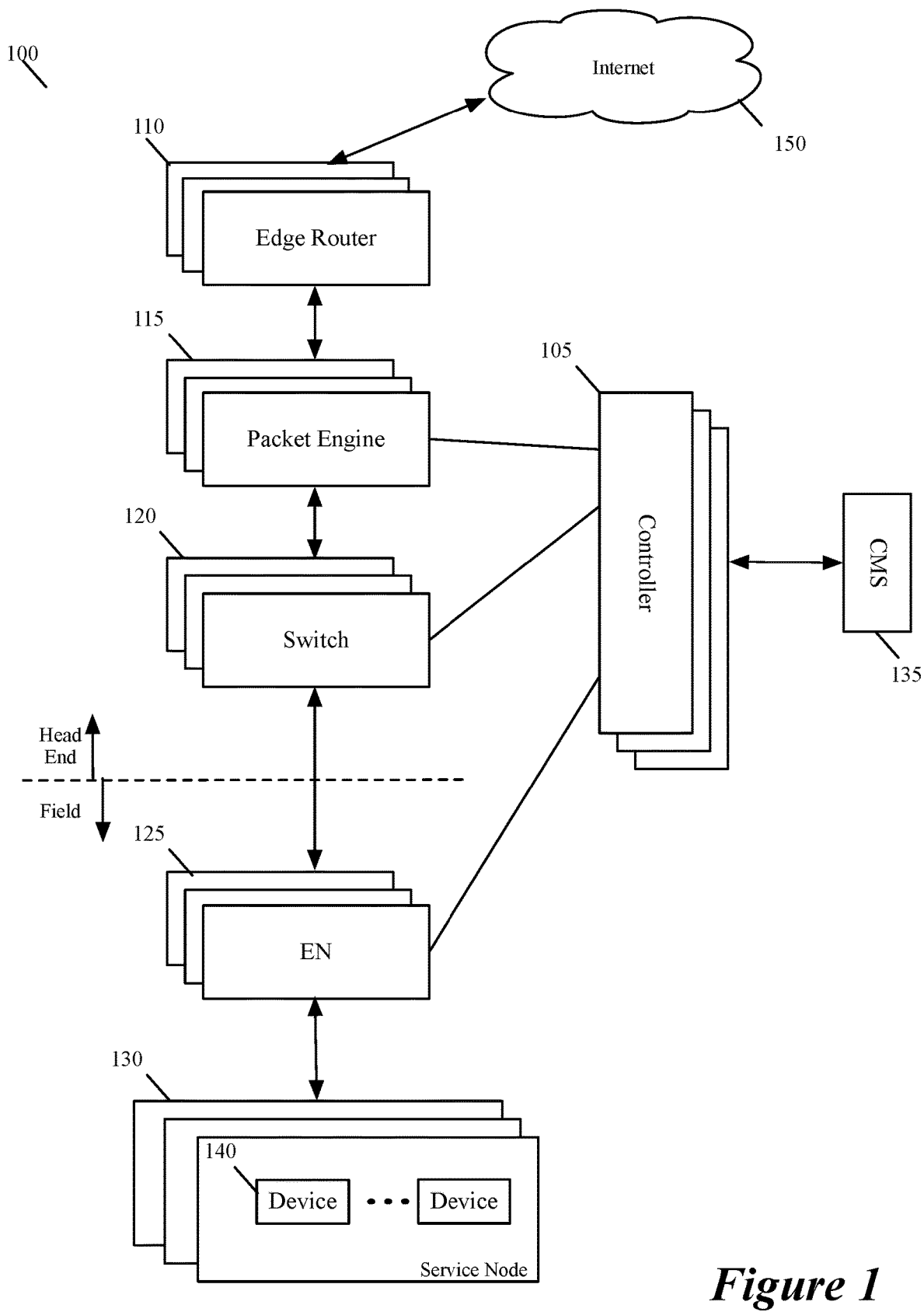
FIG. 1 illustrates the controller set and distributed cable management system of some embodiments.

A set of one or more controllers that manage the modules of a distributed cable management system (DCMS) implements the method for dynamically creating a service flow of some embodiments. FIG. 1 illustrates the controller set 105 and DCMS 100 of some embodiments. The DCMS 100 provides many different types of services (such as Internet access, analog television channels, digital television channels, on-demand channels, voice over IP, DOCSIS channels, etc.) to service nodes 130 at many different locations. The distributed architecture of this system is designed such that it can provide the service nodes with high-speed data for the desired services in a scalable, cost effect manner.

In addition to the controller set 105, the system 100 includes (1) a set of one or more edge routers 110, (2) a set of one or more packet engines 115, (3) a set of one or more switches 120, (4) several ENs 125, and (5) a call management server (CMS) 135. In some embodiments, the edge router set 110, packet engine set 115 and switch set 120 are located within one facility (referred to as the headend in the discussion below), while the ENs and service nodes are in remote locations (collectively referred to as the "field" in the discussion below). In some embodiments, the controller set 105 and the CMS 135 are also in the headend, while in other embodiments, one or both of these are in other facilities.

The edge router set 110 connect the packet engine set 115, and thereby the switches, ENs and service nodes, to the Internet 150. The edge routers handle north-south data packet traffic out of and into the cable management system. The packet engine set is responsible for routing packets to and from the devices 140 at the service nodes 130 through the switches 120, ENs 125, and cable modems (not shown) at the service nodes 130. Each packet engine has a limited number of input ports, which may not be able to accommodate traffic for a far greater number of ENs for which the packet engine is responsible. Hence, one or more switches 120 are inserted between each packet engine and its associated set of ENs. Different embodiments use different techniques to direct packets to, and from, an EN from, and to, the EN's associated packet engine through their associated switch 120. Several methods for mapping the interfaces of packet engines and switches to each other and to service flows at the EN are described in concurrently filed U.S. patent applications entitled "Mapping Cable Service Flows to IP Network", concurrently filed U.S. patent applications entitled "Assigning QoS to Cable Service Flows", and concurrently filed U.S. patent applications entitled "Selective Configuration of Packet Engine for Cable Service Flows".

Each EN connects multiple service nodes to the cable headend of the DCMS 100. The services nodes that are services by one EN are typically within one contiguous geographic region. In some embodiments, a service node represents a subscriber of cable services. Such a subscriber can be a household, an apartment, an office, etc. A service node includes one or more cable modems for receiving and transmitting cable signals on its neighborhood CATV cable.

A cable modem at a service node in turn translates the received cable signals into data for subscribing devices 140 (e.g., set top box (STB), customer premise equipment (CPE), computers, handheld devices, multimedia terminal adapter (MTA), etc.) of subscribed cable services (e.g., video on demand, voice over IP, etc.). In some embodiments, some of the subscribing devices have their own modems for directly receiving the subscribed services, such as an embedded MTA (eMTA). An MTA is a CPE device that connects telephones and other end-user devices to the PacketCable network of the DCMS 100. The PacketCable network refers to the components of the system 100 that implement the PacketCable specification, which is a cable industry standard specification. In addition to eMTAs, the PacketCable specification defines standalone MTA (S-MTA), which is a separate MTA that requires a DOCSIS 1.1 (or higher) cable modem to connect to the cable network (as opposed to an eMTA that is integrated into a cable modem).

In some embodiments, each EN 125 communicatively (1) connects to a switch 120 through one or more fiber optic cables to exchange digital data packets, and (2) connects to numerous service nodes (e.g., tens to hundreds of service nodes) through CATV cables to exchange radio frequency (RF) modulated signals. In some embodiments, each EN is associated with a MAC address, enabling a switch to direct to the EN the packets that are addressed to it and forward packets that are sent by the EN. This distributed architecture of system 100 is referred to as a remote MAC and PHY architecture because the in-the-field ENs that service multiple service nodes are MAC addressable, receive digital data packets, and perform the physical layer conversion to convert the digital data packets to RF signals in the field.

Each EN in some embodiments converts data packets from the cable headend into a DOCSIS compliant RF signal that are to be processed by DOCSIS compliant cable modems at the service nodes. In some embodiments, an EN strips the header information of the downstream IP packets it receives and delivers only the payload to the cable modem through the CATV cable. In other embodiments, an EN transmits the downstream IP packets in their entirety (header and payload) to the CATV cable. In some embodiments, the payloads of IP packets are digitized samples of RF waveforms, and the EN uses the digitized samples to reconstitute the RF waveform over the CATV cable. In some embodiments, the payloads of IP packets are QAM symbols, and the EN sends RF waveforms that are QAM modulated according to the received QAM symbols.

Each EN has static and dynamic service flows for processing upstream packets from the devices 140 at the service nodes 130 and downstream packets to the devices 140 at the service nodes 130. This processing entails directing the packets to their eventual destinations. It also entails applying different QoS guarantees on the data packets of the different data flows.

The controller set 105 defines the operation of the DCMS 100 by configuring the operation of the packet engines 115, switches 120, and ENs 125. One of the configurations provided by the controller set is to dynamically provide to an EN a set of parameters that the EN needs to dynamically create a service flow for processing a phone call request from a device at a service node.

Figure 2:
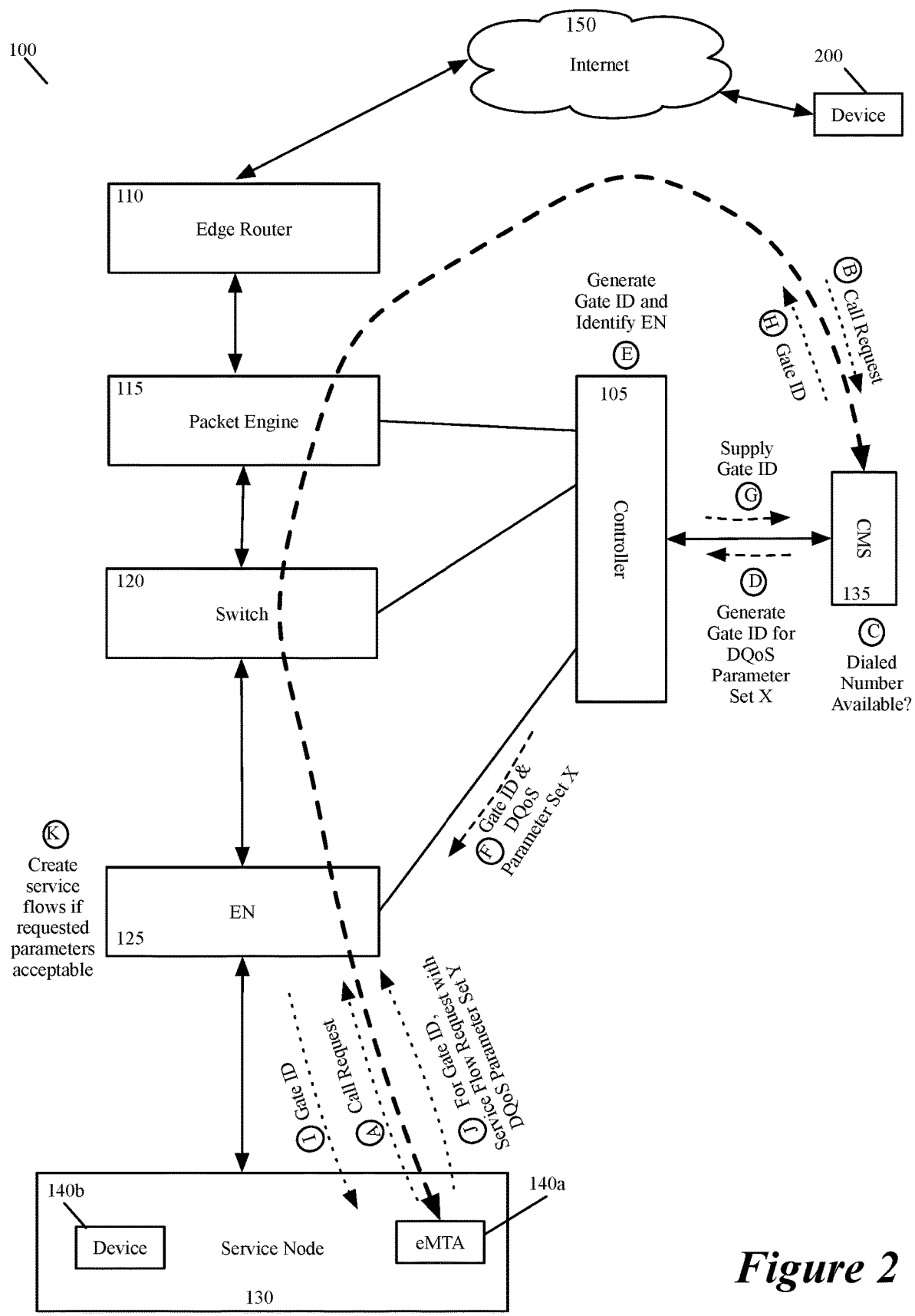
FIG. 2 presents a data flow diagram that illustrates the overall process for dynamically creating two service flows for a call that is requested by an eMTA at a service node.

FIG. 2 presents a data flow diagram that illustrates the overall process for dynamically creating two service flows for a call that is a requested by an eMTA 140a at a service node 130. As shown, this process starts when the eMTA 140a sends a call request to the CMS 135. FIG. 2 depicts this start by showing the call request leaving the eMTA and arriving at the CMS, as noted by message designations A and B on this figure. As shown, this call request traverses through the components of the DCMS 100 (e.g., the EN 125 connected to the eMTA's service node and one or more of the other components 120, 115, and 110 of the DCMS 100), but is through an out-of-band communication channel that is transparent to these components.

FIG. 2 illustrates the call request reaching the CMS without going through the Internet 150 or some other external network. This implies that the CMS is located in the same facility as the other components of the headend. In other embodiments, however, the CMS is located in a different facility. In such case, the call request may have to be routed to the CMS through the Internet or an external network.

The CMS is a server that provides the signaling functions that allow MTAs to establish a call over the PacketCable network. In some embodiments, the CMS uses network-based call signaling protocol to provide authentication, authorization, call routing, special feature support (e.g., three-way calling). In some embodiments, the CMS provides a gate controller (GC) function as well, while in other embodiments the GC functionality is provided by a server that typically executes on the machine as the CMS. The GC controls the establishment of gates for the PacketCable connection session. A gate is a logical entity in the DCMS 100 (in much the same way as it is in many cable modem termination system (CMTS) employed today) that is associated with a pair of service flows with a QoS guarantee. In some embodiments, one gate controls one upstream service flow and one downstream service flow that are needed to establish a voice call per PacketCable network.

After receiving the phone call request, the CMS ensures that the party (e.g., number) being dialed is available (e.g., is in a mode to accept calls), as shown by the message designation C on FIG. 2. If the dialed party is available, the CMS identifies the DQoS parameter set that is stored in the CMS storage, or in a CMS-accessible storage, for the eMTA 140a that is requesting the call. The CMS then provides the DQoS parameter set to a controller 105 with a request to create a gate as shown by the message designation D on FIG. 2. When the system uses a GC that is separate from the CMS, the request to create the gate (as well as the DQoS parameter set for the gate) is sent by the GC at the behest of the CMS. When a call is to be established between two devices of the PacketCable network, the CMS/GC request the creation of two gates for the two ends of the call. To communicate with the controller set (as well as other components of the PacketCable network), the CMS/GC use the Common Open Policy Service (COPS) protocol in some embodiments.

After receiving the request to create a gate, the controller 105 creates the gate identifier and identifies the EN that is responsible for connecting the eMTA 140a to the PacketCable network. In FIG. 2, these operations are depicted by the message designation E. After creating the Gate ID, the controller provides the Gate ID and the authorized DQoS parameter set (that it received from the CMS/GC) to the identified EN (the EN that the controller identified), as depicted by message designation F in FIG. 2.

The controller 105 also provides the Gate ID to the CMS/GC, and the CMS relays this Gate ID to the eMTA 140a. Message designations G, H, and I depict this messaging in FIG. 2. Again, this messaging is through an out-of-band communication channel that can traverse through the components of the DCMS 100 but are transparent to these components. After receiving the Gate ID, the eMTA 140a sends a service flow request with the desired DQoS parameter set to the EN 125, as depicted by the message designation J in FIG. 2.

The EN 125 then determines whether the requested set of DQoS parameters should be provided by comparing the requested set with the authorized set of DQoS parameters, which the EN received from the controller depicted by the message designation K. The identified EN creates the requested service flow when the requested set of DQoS parameters comports with the authorized set of DQoS parameters (e.g., when none of the QoS parameters in the requested set exceed the corresponding QoS parameters in the forwarded set), and rejects the service flow request when the requested set does not comport with the authorized set (e.g., when one or more QoS parameters in the requested set exceed the corresponding QoS parameters in the forwarded set). In some embodiments, the forwarded DQoS parameter set includes parameters that express the type of compressor/decompressor (codec) to use, the baud rate to provide, etc. Additional of DQoS parameter sets will be described below.

Figure 3:
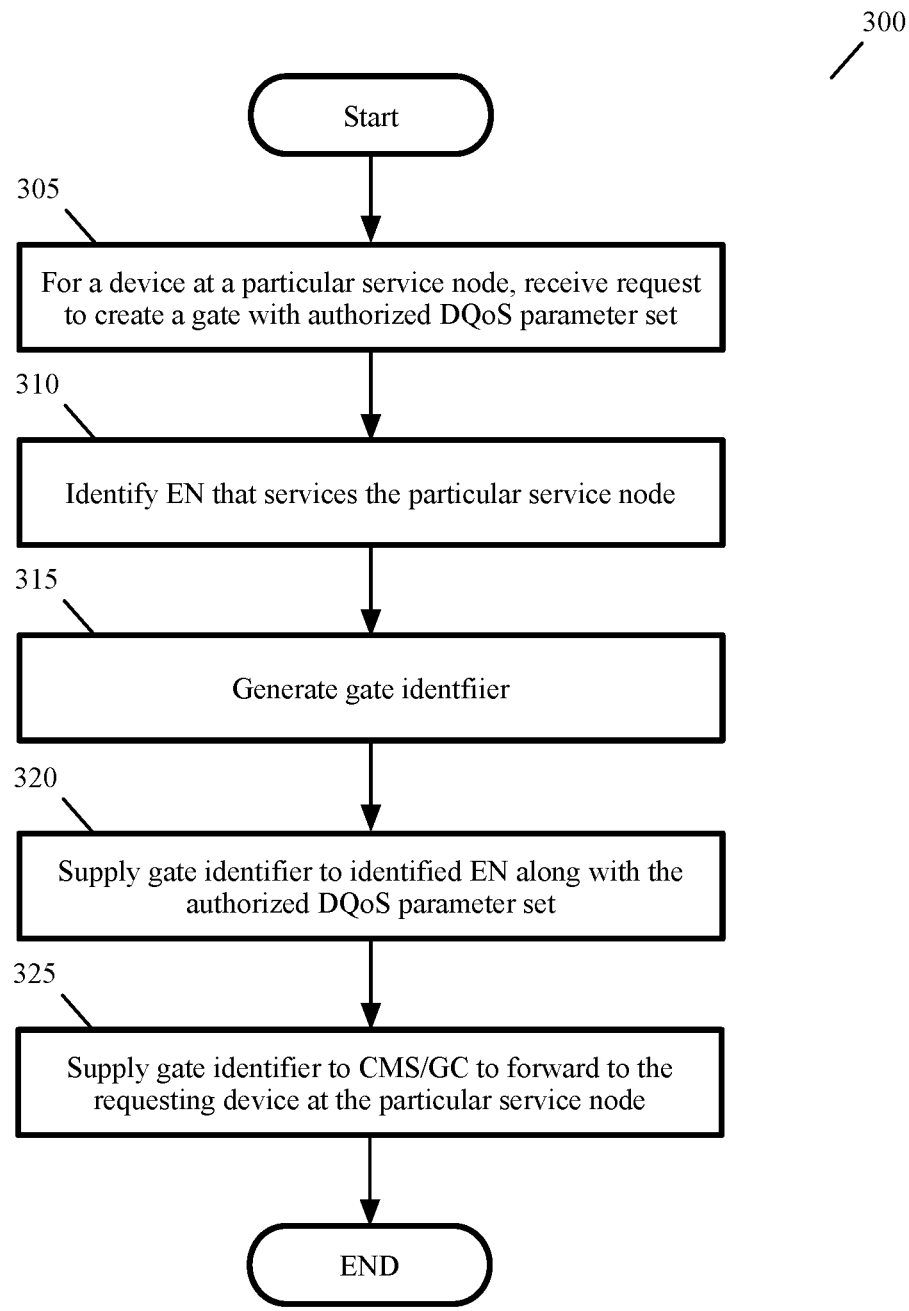
FIG. 3 illustrates a process performed by the controller of some embodiments to facilitate the dynamic creation of service flows for a call request from a PacketCable device.

FIG. 3 illustrates a process 300 performed by the controller 105 of some embodiments to facilitate the dynamic creation of service flows for a call request from a PacketCable device. The process 300 starts after the CMS receives a phone call request from a particular device at a particular service node, and ensures that the party (e.g., number) being dialed is available (e.g., is in a mode to accept calls). After determining that the dialed party is available, the CMS identifies the DQoS parameter set that is stored in the CMS storage, or in a CMS-accessible storage, for the particular device, and then the CMS/GC provides (at 305) the controller with the DQoS parameter set with a request directing the controller to create a gate for a new pair of service flows.

After receiving the request to create a gate, the process identifies (at 310) the EN that is responsible for connecting the particular device to the PacketCable network. The process 300 then creates (at 315) a gate identifier (Gate ID) for the requested gate. After creating the Gate ID, the process provides (at 320) the Gate ID and the authorized DQoS parameter set (that it received from the CMS/GC) to the identified EN (the EN identified at 310). The process 300 then provides (at 325) the Gate ID to the CMS/GC, so that the CMS can relay this Gate ID to the particular device. After 325, the process 300 ends.

Figure 4:
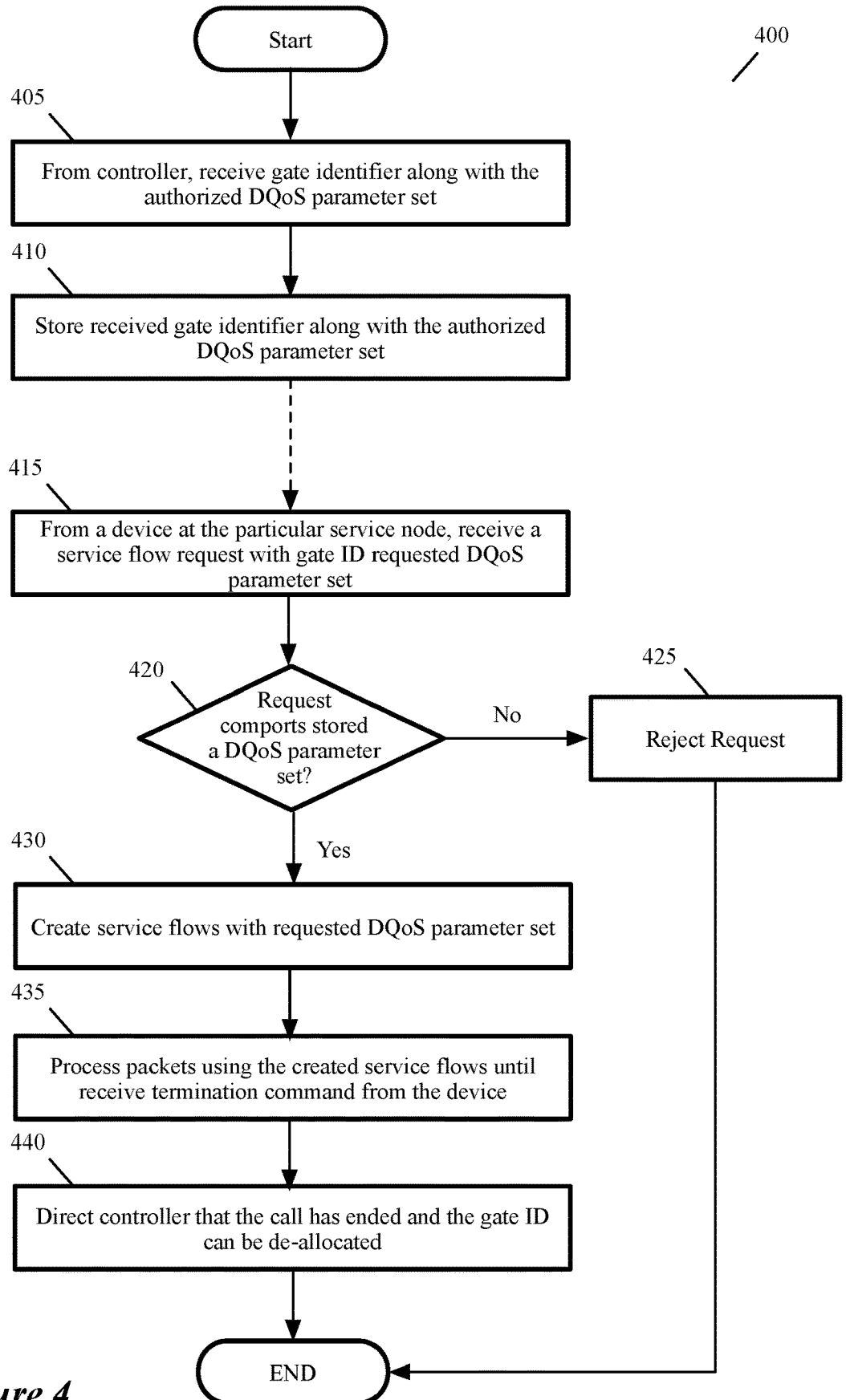
FIG. 4 illustrates a process that an Ethernet node (EN) performs to dynamically create a service flow with a QoS guarantee.

After receiving the Gate ID, the requesting device sends a service flow request with the desired DQoS parameter set to its service node's EN. FIG. 4 illustrates a process 400 that an EN performs to dynamically create a service flow with a QoS guarantee. As shown, the process 400 starts when the EN receives (at 405) a Gate ID and a set of authorized DQoS parameters from a controller. The received parameters are part of a pre service-flow request that the EN receives in some embodiments to prepare for a possible service flow request from the particular device. The process stores (at 410) the received gate identifier and the authorized DQoS parameter set for the gate identifier, so that it can later use these parameters to validate a service flow request that is accompanied by the particular gate identifier.

Typically, a transient time after storing the gate identifier and the associated DQoS parameter set, the EN receives (at 415) a service flow request from the device (e.g., eMTA) that is trying to make the phone call. This transient delay is depicted by a dash line between operations 410 and 415. As shown, the received service flow request is accompanied by a requested DQoS parameter set.

At 420, the process determines whether the requested set of DQoS parameters should be provided by comparing the requested set with the authorized set of DQoS parameters that was received at 405 and stored at 410. To identify the correct authorized DQoS parameter set, the process uses the Gate ID that it receives with the service flow request from the particular device to retrieve the DQoS parameter set that it stores for this Gate ID.

The process rejects (at 425) the service flow request and then ends, when the requested DQoS parameter set does not comport with the forwarded DQoS parameter set (e.g., when one or more QoS parameters in the requested set exceed the corresponding QoS parameters in the forwarded set). On the other hand, the process creates (at 430) the requested service flow when the requested DQoS parameter set comports with the forwarded DQoS parameter set (e.g., when none of the QoS parameters in the requested set exceed the corresponding QoS parameters in the forwarded set). As mentioned above, the EN in some embodiments creates two service flows for each gate, one service flow for downstream data packets to the dialing device (i.e., the particular device) and one service flow for upstream data packets from the dialing device. Accordingly, in these embodiments, the process 400 would create (at 430) two service flows (one for the downstream direction and another for the upstream direction) for each Gate ID. After creating the requested service flows, the process 400 starts to use (at 435) the created service flows to process data packets to and from the particular device for the requested call.

The process stays at 435 and continues to use the created service flows to process packets for the call until it receives a call termination message from the device (e.g., the eMTA) that initiated the call. In response, the process sends (440) a message to the controller that the call has ended and the Gate ID can be de-allocated. The controller, in turn, directs the CMS that the call has ended and the Gate ID is being de-allocated. At 440, the process also eliminates the dynamically created the service flows. After 440, the process ends.

Figure 5:
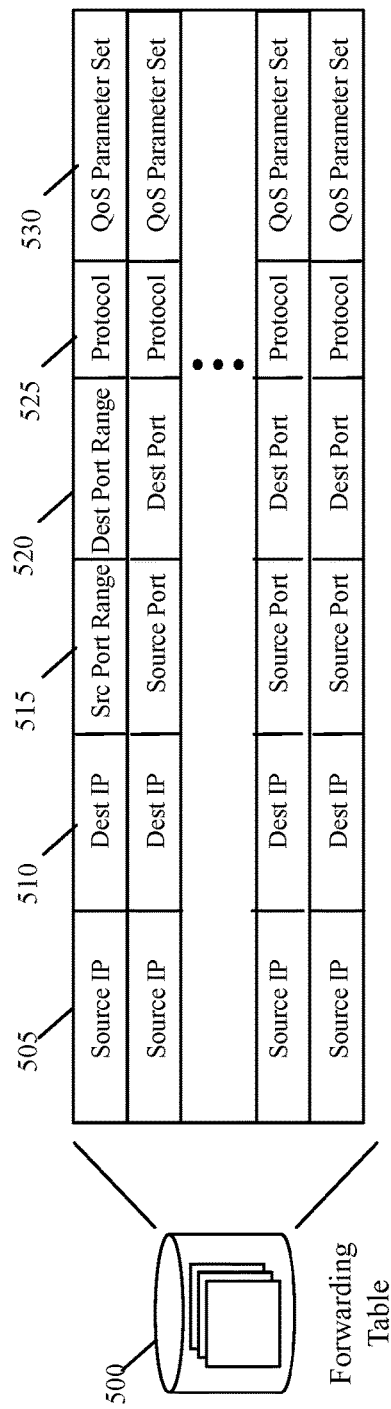
FIG. 5 illustrates examples of service flows that are stored by an EN.

FIG. 5 illustrates examples of service flows that are stored by an EN 125. As shown, the service flows are flow entries in a forwarding table storage 500 that the EN's packet processor uses to determine how to process packets to and from the devices 140 of the service nodes 130. Each service flow includes five tuples, which are source IP 505, destination IP 510, source port range 515, destination port range 520, and protocol 525 (e.g., UDP). The five tuples are used to match each service flow against the corresponding values of header values of received packets.

As shown, each service flow also include a QoS parameter set that provides one or more QoS parameters for defining the QoS level to provide to any packet that matches the service flow. When the EN's packet processor identifies a service flow as the matching service flow for a received packet, the packet process uses the QoS parameter set to identify the QoS that it needs to provide in processing the packet. In addition to the five tuples and QoS parameter set, each service flow can include other parameters, such as action fields that define the type of action (e.g., pass through, drop, etc.) to perform on a received packet.

In some embodiments, several of the service flows illustrated in FIG. 5 are service flows associated with a dynamically created secondary PC connection session (i.e., are secondary service flows that are dynamically created). Also, as mentioned above, some embodiments create an upstream secondary service flow and a downstream secondary service flow for each PC connection session.

Figure 6:
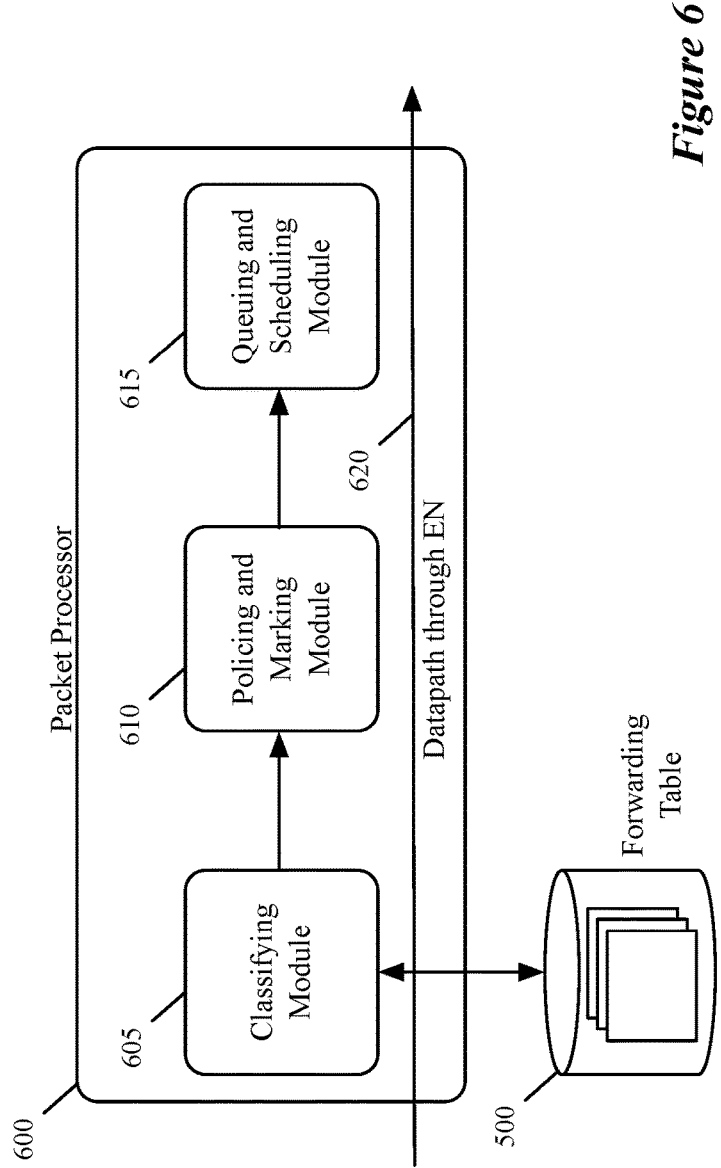
FIG. 6 conceptually illustrates the modules of the packet processor of an EN of some embodiments.

FIG. 6 conceptually illustrates the modules of the packet processor 600 of an EN 125 of some embodiments. These modules can be implemented as hardware and/or software modules by dedicated or general purpose hardware (e.g., by ASIC, FPGA, or microprocessor). The modules illustrated in this figure are conceptual illustration of certain functionality that is performed by the EN's packet processor in some embodiments. One of ordinary skill will realize that these functionalities can be performed by fewer or more modules in some embodiments.

As shown, the packet processor 600 includes a classifying module 605, a policing and marking (PM) module 610, and a queuing and scheduling (QS) module 615 that are in the datapath 620 (e.g., downstream datapath or upstream datapath) of the EN. The classifying module compares a packet with the service flows to identify a matching service flow for the packet and to assign a tag to the packet that defines the type of QoS that the packet processor needs to provide to the packet. FIG. 6 shows the classifier 605 accessing the forwarding table storage 500 to try to identify a matching service flow for a packet. In some embodiments, the classifier also uses a cache storage (not shown) to store the service flows that have matched recently received packets. The cache storage is easier to search (e.g., as it can be hash indexed) in some embodiments. Accordingly, the classifier first searches the cache storage to identify a matching service flow, and if it does not find the matching service flow in the cache storage, it then searches the forwarding table storage 500.

The PM module 610 then analyzes the tag assigned to the packet with the current packet rate that the packet processor (e.g., the PM module) maintains for the packet's data flow to determine whether to let the packet pass through, or apply a policer action to the packet (e.g., to drop the packet or mark the packet for slower throughput). Based on the PM module's determination, a packet may be re-tagged for slower throughput. If the packet is not dropped as a result of the PM module's decision, the packet is provided to the QS module to store the packet in queue and schedule is transmission from queue based on its tag. The packet is sent out from the EN based on its queue and its schedule.

For upstream traffic of a CPE at a service node 130 that has a dynamic service flow created in the EN 125, the cable modem that relays the CPE's data packets (including any embedded cable modem, e.g., an embedded cable modem of an eMTA) at the service node 130 to the EN 125 also need to have a service flow to associate the CPE's data packets to the dynamically created service flow on the EN. When a cable modem receives any data packet from the CPE, the cable modem matches the data packet with the classifiers, in order to associate the data packet with the upstream service flow on the EN, and then sends along the data packet to the EN using that upstream service flow. For service flows (e.g., secondary service flows), the cable modem can reserve bandwidth from the EN for the upstream service flow to ensure that the desired QoS can be provided for the service flow.

The EN then matches the packet to its upstream service flow and then performs QoS operations based on the service flow's associated QoS parameter set. As mentioned above, the cable modem in some embodiments directs the EN to create a service flow after getting the Gate ID for a requested PC connection session. For instance, when the call agent gets a response from the controller with a Gate ID, the call agent in some embodiments sends a MGCP/NCS protocol message with the received Gate ID to the cable modem. This message tells the cable modem to initiate the service flow creation in both upstream as well as downstream directions.

In some embodiments, the dynamically created service flow is a secondary service flow that supplements one or more primary service flows that are statically created for processing data packets from the devices of a service node. In these embodiments, the cable modem sends a data packet from a CPE to the EN along a secondary flow if one exists once the cable modem matches the data packet header values to the service flow classifiers. If there is no secondary service flow, the cable modem sends the data traffic along the primary service flow Similarly, for downstream traffic coming form the EN to a cable modem, it is the job of EN to match the traffic with the classifiers associated with a flow to make sure the traffic is sent on a correctly matched service flow. If there is no match, the EN sends the traffic to the cable modem along a primary service flow. If there is match, the traffic is sent on the secondary service flow. The EN not only enforces the QoS guarantee on the upstream traffic to the CPE, but it also performs the QoS operations on the downstream traffic to the CPE.

In some embodiments, the DCMS 100 also includes one or more record keeping servers (RKS) for keeping track of billing associated with a PC phone call or video conference. In some such embodiments, one of the components of the DCMS has to inform the RKS when a call (or video conference) is established and is terminated so that the RKS can starts and end its billing for the call (or video conference). For instance, once EN creates a service flow pair at the request of cable modem, the EN of some embodiments tells controller that the flow pair has been created but is not active; the service flow pair has just been created to reserve bandwidth for it until the phone (or video conference) is answered by the dialed party. At this point, the controller informs the RKS that a service flow pair has been created but it is in a reserved (inactive) state. At this point, the EN also provides a service flow identifier (distinct from the Gate ID) for the created service flow pair to the cable modem.

When the call (or video conference invitation) is answered, the cable modem is notified by CMS of this event and the cable modem tells the EN to activate the service flow pair using the service flow identifier that it received from the EN. At that time, the EN notifies controller of the activate state and controller tells the RKS to activate the billing. When the call (or video conference) ends, the CM notifies the EN, and the EN notifies the controller, which then notifies the RKS of this event. At this point, the RKS ends the billing for the call (or video conference). One of ordinary skill will realize that other embodiments can follow a different sequence for activating a service flow pair and commencing/ending the billing for a PC connection session.

In different embodiments, the CMS can provide different DQoS parameters to the controller. Examples of DQoS parameters include: max_traffic_rate, max_traffic_burst, min_reserved_rate, min_reserved_pkt_size, max_concat_burst, nominal_polling_interval, tolerated_poll_jitter, unsolicit_grantsize, nominal_grant_interval, tolerated_grant_jitter, grants_per_interval, max_latency, active_timeout, admitted_timeout, scheduling_type, request_policy, type_of_service_params, direction, dscp_overwrite, app_id, peak_traffic_rate, minimum_buffer, target_buffer, and maximum buffer. Based on the codec type (e.g. G.711, G.729, G.723 etc.) and the packetization period (e.g., 10 ms, 20 ms, 30 ms etc), the CMS calculates the appropriate QoS params and sends to controller for PC DQoS call. If there is not enough bandwidth/capabilities on EN to accommodate these parameters, the service flow creation could be rejected. For voice call, the subscriber will get overflow/busy tone on such a failure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
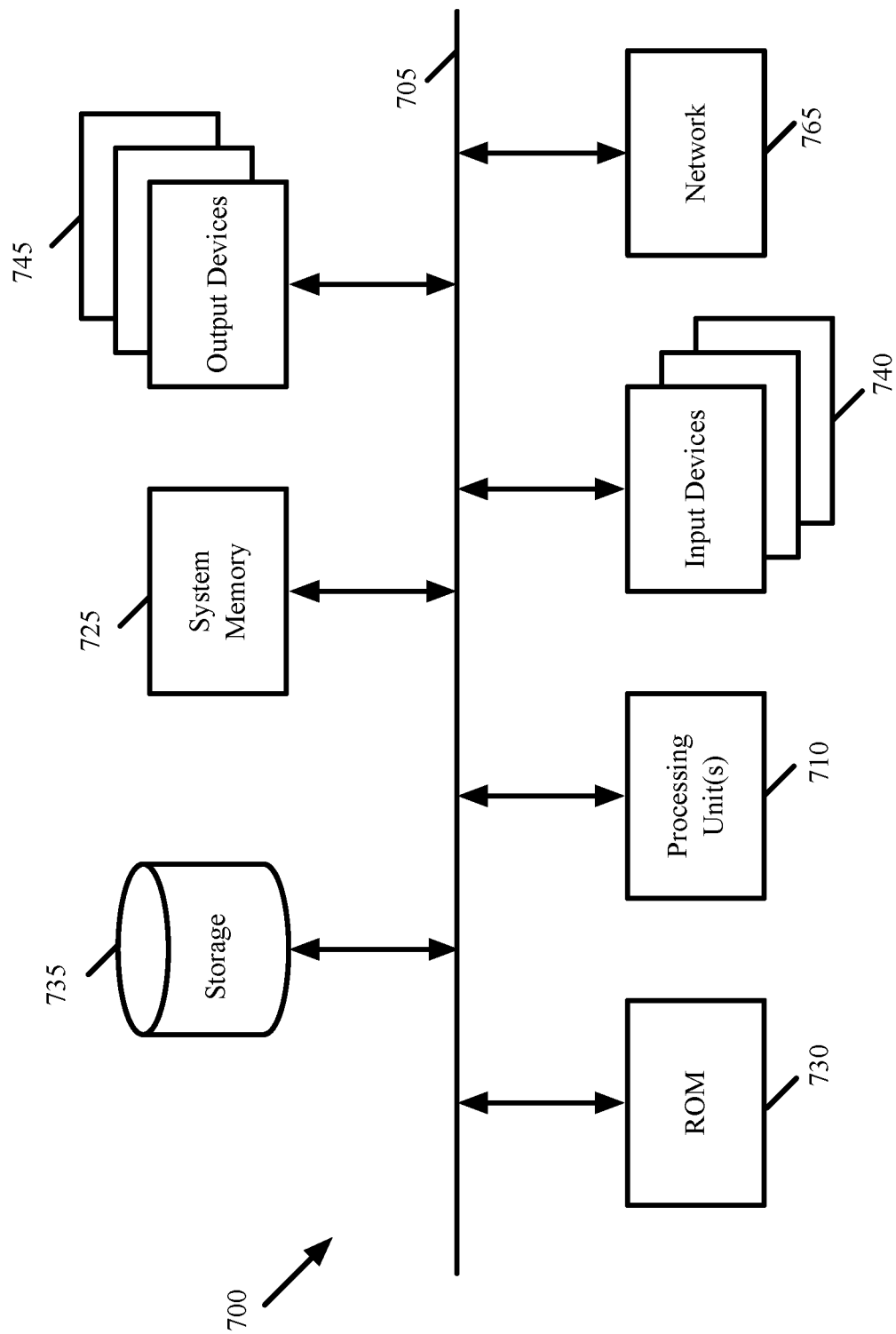
FIG. 7 conceptually illustrates an electronic system with which some embodiments of the invention are implemented.

FIG. 7 conceptually illustrates an electronic system 700 with which some embodiments of the invention are implemented. The electronic system 700 can be used to execute any of the control, virtualization, or operating system applications described above. The electronic system 700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 725, and the permanent storage device 735.

From these various memory units, the processing unit(s) 710 retrieves instructions to execute and data to process in order to execute the processes of the invention. The processing unit(s) may be a single processor or a multi-core processor in different embodiments.

The read-only-memory (ROM) 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such a random access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieves instructions to execute and data to process in order to execute the processes of some embodiments.

The bus 705 also connects to the input and output devices 740 and 745. The input devices enable the user to communicate information and select commands to the electronic system. The input devices 740 include alphanumeric keyboards and pointing devices (also called "cursor control devices"). The output devices 745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 7, bus 705 also couples electronic system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. An Ethernet node in a distributed cable management system coupled to a plurality of service nodes and at least one call management server in a cable head end, comprising:
    at least one memory device; and
    at least one processing device configured to:
        receive an authorized dynamic Quality of Service (DQOS) parameter set and a Gate identifier from the call management server in the cable head end and storing the Gate identifier and authorized DQoS parameter set in the at least one memory;
        receive a service flow request from one of the service nodes, wherein the service flow request includes the Gate identifier and a desired DQoS parameter set;
        compare the desired DQoS parameter set and the authorized DQoS parameter set associated with the Gate identifier from the call management server; and
        create the requested service flow when the desired DQoS parameter set comports with the authorized DQoS parameter.

2. The Ethernet node of claim 1, wherein the at least one processing device is further configured to:
    reject the requested service flow when one or more of the desired DQoS parameter set exceeds the authorized DQoS parameter set.

3. The Ethernet node of claim 1, wherein the at least one processing device is further configured to:
    receive the service flow request from the one of the service nodes in an out-of-band communication channel, wherein the service flow request includes a request for a call for a device coupled to the one of the service nodes.

4. The Ethernet node of claim 3, wherein the authorized DQoS parameter set is preconfigured for the device.

5. The Ethernet node of claim 1, wherein the authorized DQoS parameter set includes a type of compressor/decompressor (codec) and a baud rate.

6. A method of an Ethernet node in a distributed cable management system, wherein the Ethernet node is coupled to a plurality of service nodes and at least one call management server in a cable head end, comprising:
    receiving an authorized dynamic Quality of Service (DQOS) parameter set and a Gate identifier from the call management server in the cable head end and storing the Gate identifier and authorized DQoS parameter set in at least one memory;
    receiving a service flow request from one of the service nodes, wherein the service flow request includes the Gate identifier and a desired DQoS parameter set;
    comparing the desired DQoS parameter set and the authorized DQoS parameter set associated with the Gate identifier from the call management server; and
    creating the requested service flow when the desired DQoS parameter set comports with the authorized DQoS parameter.

7. The method of the Ethernet node of claim 6, further comprising:
    rejecting the requested service flow when one or more of the desired DQoS parameter set exceeds the authorized DQoS parameter set.

8. The method of the Ethernet node of claim 6, further comprising:
- receiving the service flow request from the one of the service nodes in an out-of-band communication channel, wherein the service flow request includes a request for a call for a device coupled to the one of the service nodes.

9. The method of the Ethernet node of claim 6, wherein the authorized DQoS parameter set is preconfigured for the device.

10. The method of the Ethernet node of claim 9, wherein the authorized DQoS parameter set includes a type of compressor/decompressor (codec) and a baud rate.

* * * * *